United States Patent
Vyas et al.

(10) Patent No.: US 12,309,595 B2
(45) Date of Patent: May 20, 2025

(54) FAKE CELL DETECTION

(71) Applicant: QUALCOMM Incorporated, San Diego, CA (US)

(72) Inventors: Uttam Vyas, Hyderabad (IN); Muralidharan Murugan, Hyderabad (IN); Subrato Kumar De, San Diego, CA (US); Rishika Tindola, Hyderabad (IN); Mattias Kaulard Huber, Solana Beach, CA (US); Ankur Bhattacharjee, San Diego, CA (US); Krishna Ram Budhathoki, San Diego, CA (US); Naresh Maradana, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 17/869,662

(22) Filed: Jul. 20, 2022

(65) Prior Publication Data

US 2024/0031812 A1   Jan. 25, 2024

(51) Int. Cl.
*H04W 12/122* (2021.01)
*H04W 12/082* (2021.01)

(52) U.S. Cl.
CPC ....... *H04W 12/122* (2021.01); *H04W 12/082* (2021.01)

(58) Field of Classification Search
CPC . H04W 12/122; H04W 12/082; H04W 48/02; H04W 48/12; H04W 12/12
See application file for complete search history.

(56) References Cited

U.S. PATENT DOCUMENTS

| | | | |
|---|---|---|---|
| 2013/0165077 A1* | 6/2013 | Aalla | H04W 12/122 455/411 |
| 2014/0120936 A1 | 5/2014 | Chen et al. | |
| 2018/0351975 A1* | 12/2018 | Briggs | H04W 12/126 |
| 2019/0150064 A1* | 5/2019 | Chen | H04W 48/10 370/328 |
| 2019/0174529 A1* | 6/2019 | Tie | H04W 4/70 |
| 2020/0092795 A1* | 3/2020 | Raval | H04L 63/101 |
| 2020/0178065 A1 | 6/2020 | Huber et al. | |
| 2022/0417753 A1* | 12/2022 | Cho | H04K 3/28 |

OTHER PUBLICATIONS

Anonymous: "3rd Generation Partnership Project, Technical Specification Group Services and System Aspects Study on 5G Security Enhancement against False Base Stations (FBS) (Release 17 )", 3GPP TR 33.809 V0.14.0, vol. 140, Mar. 1, 2021, pp. 1-109, XP093012993, Sections 6.7-6.8, 6.11-6.12, 6.20-6.25.
International Search Report and Written Opinion—PCT/US2023/069378—ISA/EPO—Oct. 6, 2023.

* cited by examiner

*Primary Examiner* — Quazi Farooqui
(74) *Attorney, Agent, or Firm* — Patterson & Sheridan LLP

(57) ABSTRACT

Certain aspects of the present disclosure provide a method of wireless communications at a user equipment (UE), generally including detecting, within a period, a number of indications for modification to system information from a cell and performing one or more actions, after the detection, to prevent the UE from attempting to access the cell.

20 Claims, 8 Drawing Sheets

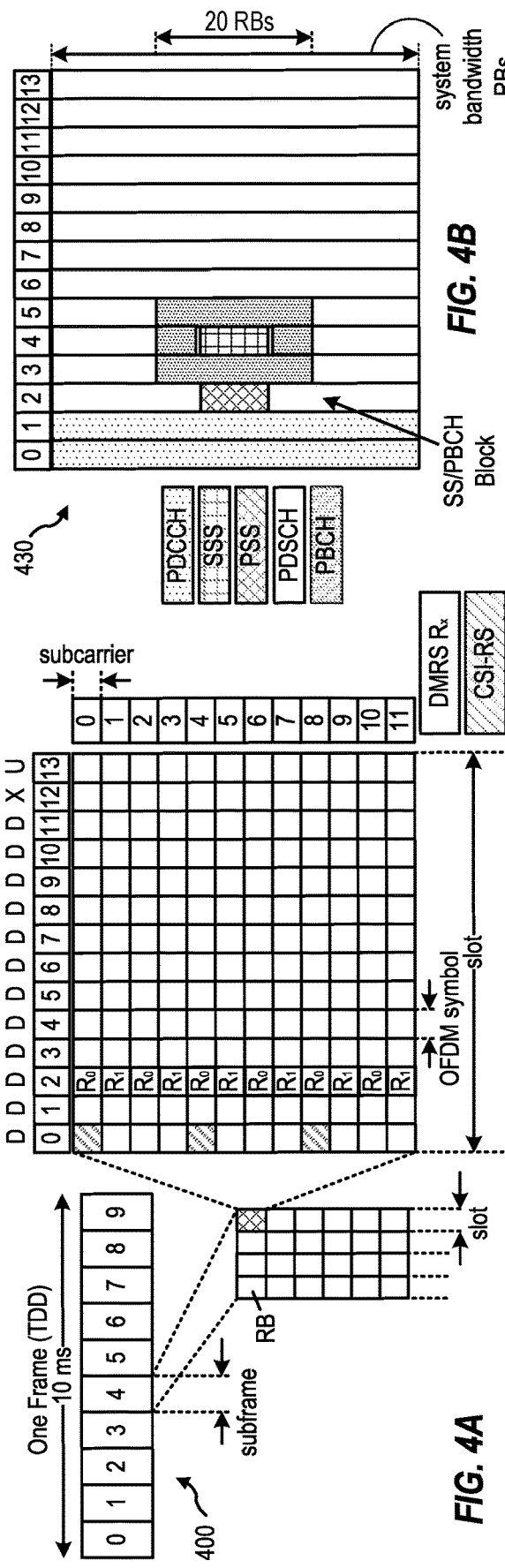
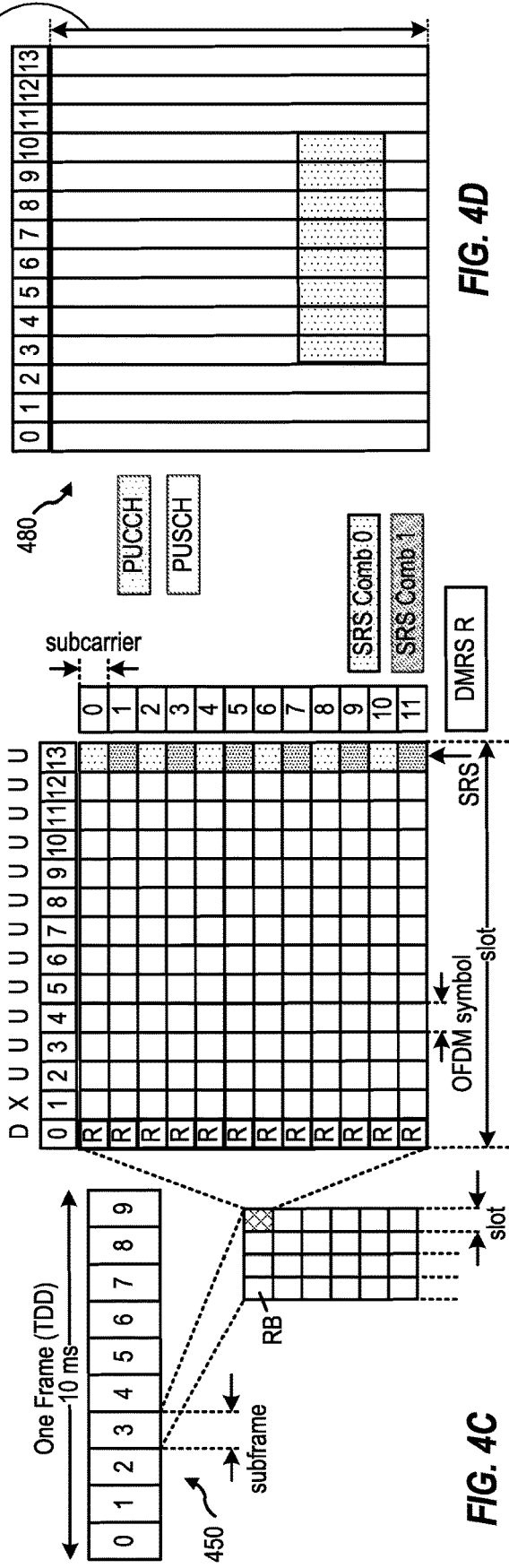

FAKE CELL DETECTION

BACKGROUND

Field of the Disclosure

Aspects of the present disclosure relate to wireless communications, and more particularly, to techniques for efficient detection and handling of a hostile attack posing as a fake cell.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a user equipment (UE). The method includes detecting, within a period, a number of indications for modification to system information from a cell; and performing one or more actions, after the detection, to prevent the UE from attempting to access the cell.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Aspects of the present disclosure provide apparatuses, methods, processing systems, and computer-readable mediums for efficient handling of a frequent system information modification scenarios caused by a fake cell.

Paging messages may be used to inform user equipments (UEs) about a system information change. If a UE receives a paging message including an indication of a modification to system information (e.g., via a systemInfoModification flag), the UE knows that the system information (SI) will change at the next modification period boundary. When the network changes system information, it first notifies the UEs about this change (e.g., during a modification period).

A network may send indications for modification to system information periodically (e.g., every 640 ms). Due to this, the UE may continue to perform a system information bock (SIB) decode, which results in high battery drain in idle mode and could cause other issues like a random access channel (RACH) failure. In certain scenarios, a UE may get stuck on a problematic cell (e.g., unable to transition from that cell), for example, when that cell continues to frequently send indications for modification to system information. In some cases, the indications may be sent with paging information or by sending a systemInfoModification indication to UE.

Unfortunately, in some cases, such frequent paging with systemInfoModification may be a form of a hostile attack referred to as a fake cell. A fake cell attack generally refers to any type of entity transmitting signals, such as SIBs, in a manner designed to appear as if the entity were transmitted from a legitimate cell.

Aspects of the present disclosure provide techniques to allow a UE to efficiently detect such a fake cell scenario (continuous systemInfoModification) and take appropriate action. For example, upon detecting multiple indications to modify SI within a given period, the UE may perform cell bar, cell blacklist, or cell deprioritization procedures to prevent UE camping on such fake cell. Performing these actions may help the UE avoid attempting to camp on a fake cell and improve UE performance and avoid battery drain.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
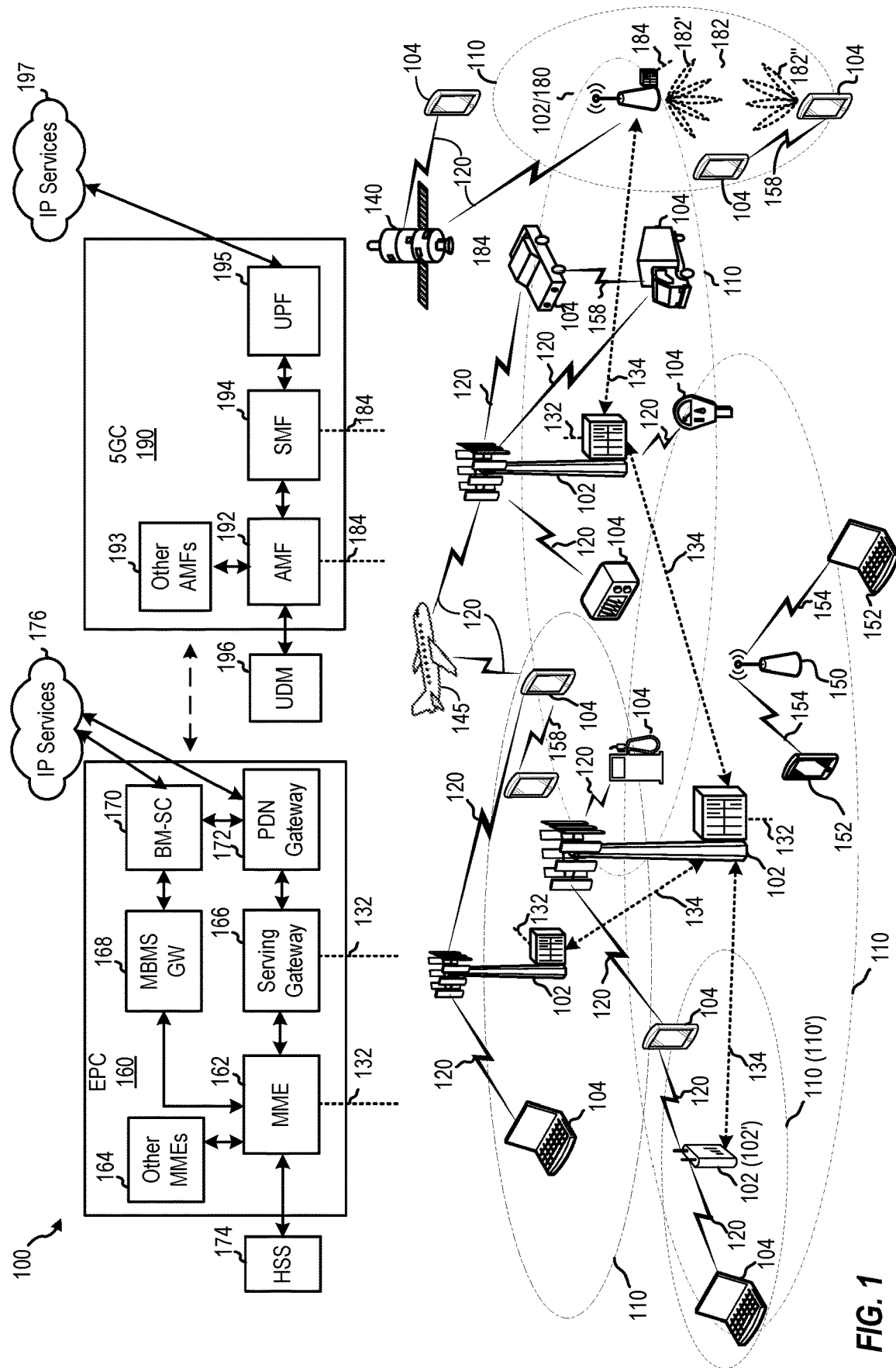
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
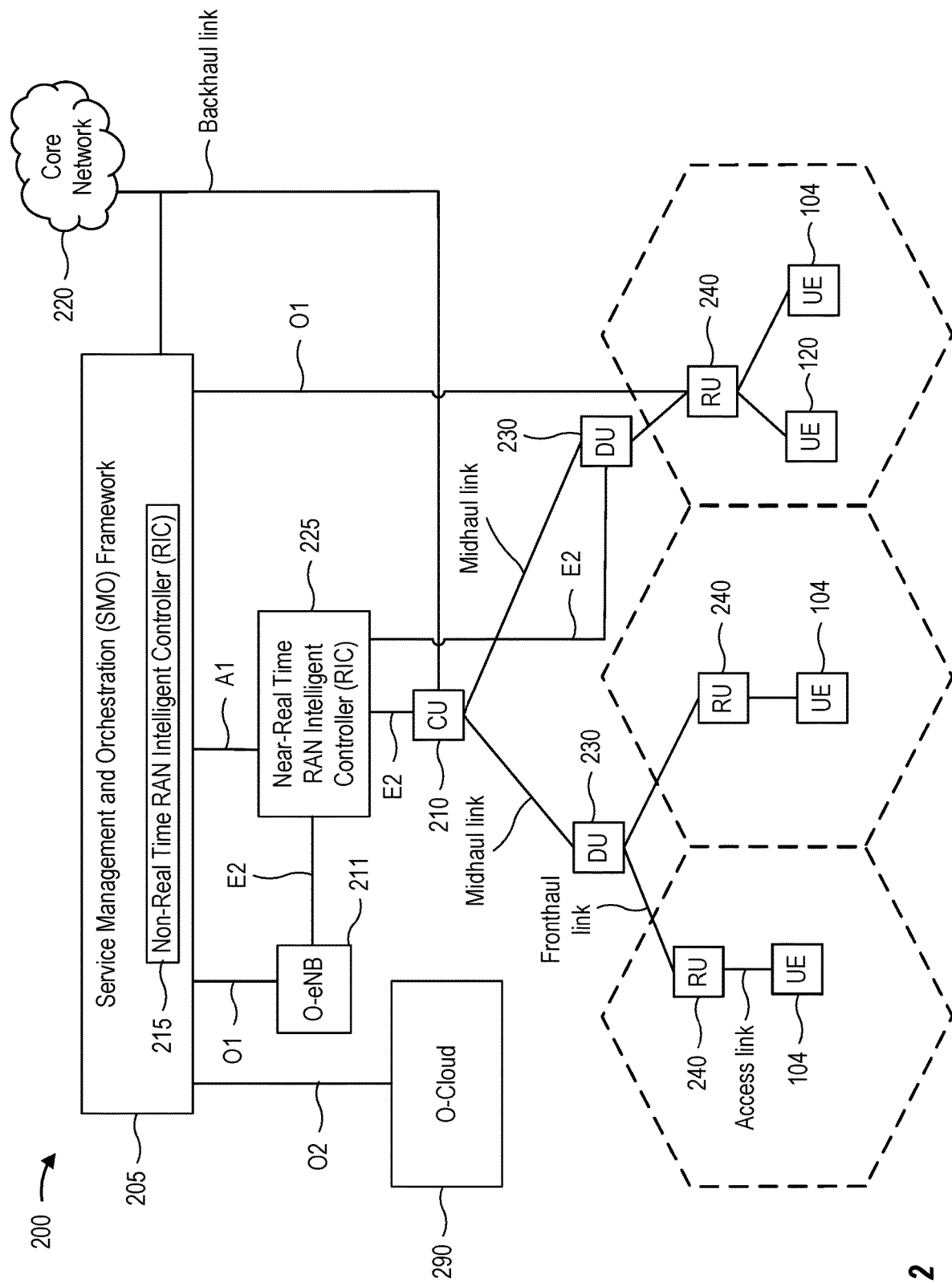
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
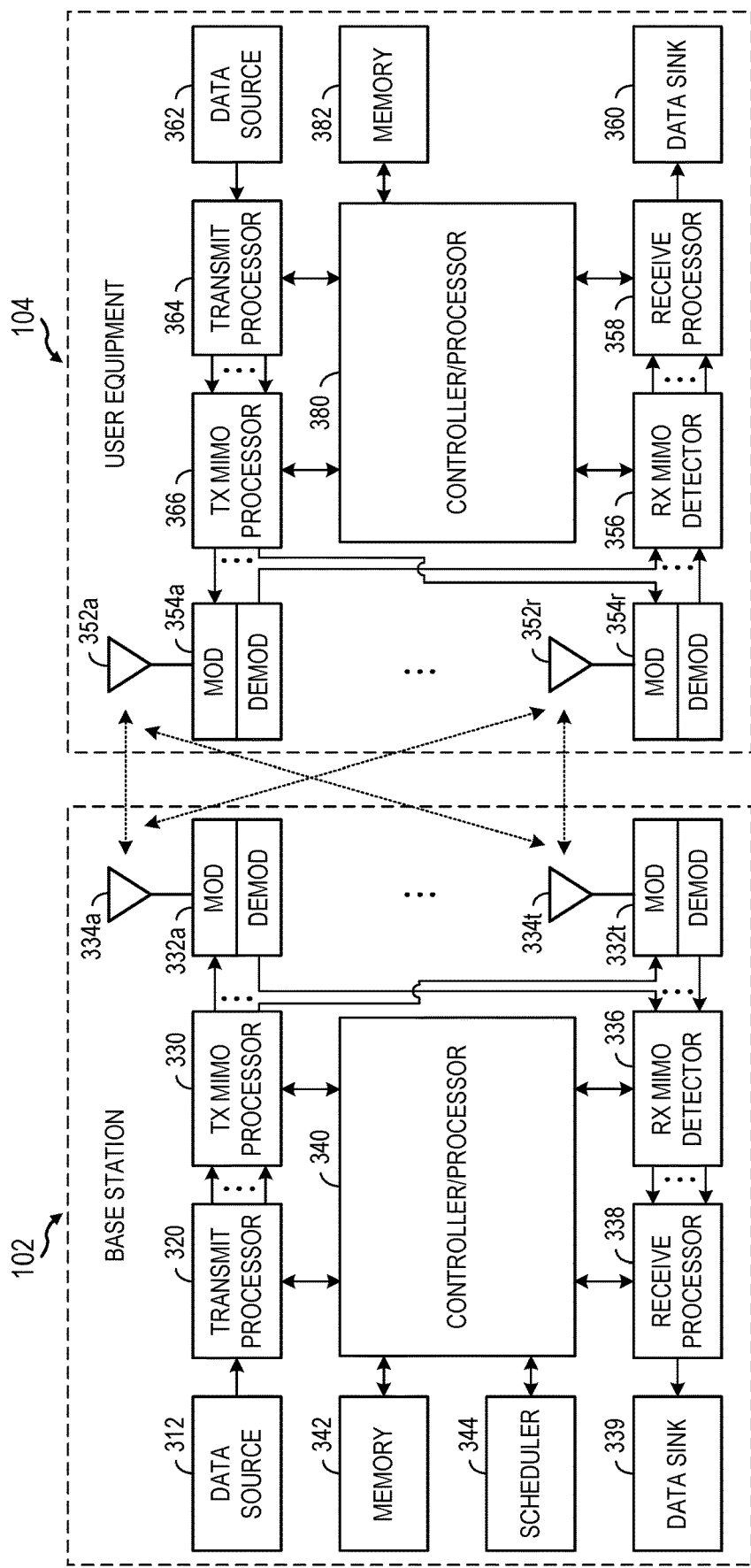
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "trans-mitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of sub carriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of a slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Mechanism to Handle Frequent System Information Modification Scenario Due to Fake Cell Aspects of the present disclosure provide apparatuses, methods, processing systems, and computer-readable mediums for efficient handling of a frequent systemInfoModification scenario caused by a fake cell.

As noted above, paging messages may be used to inform user equipments (UEs) about modifications to system information (SI). If a UE receives a paging message including an indication of a modification to SI, the UE can be ready to monitor for update SI, for example, that will change at the next modification period boundary.

Unfortunately, a hostile entity may use SI modification paging messages as part of a fake cell attack. For example, a hostile entity may send a paging with systemInfoModification, causing a UE to continue to perform system information block (SIB) decoding. As a result, fake cell attacks of this nature may result in high battery drain when a UE is in idle mode and could also cause other issues, such as a random access channel (RACH) failure.

Aspects of the present disclosure, however, may be able to identify that such frequent paging with systemInfoModification may be caused by a fake cell. Upon detecting such a (failure) scenario (e.g., based on continuous indications to modify system information), the UE may take suitable action, such as performing a cell barring procedure or a cell deprioritization procedure in order to prevent the UE camping on such a fake cell to improve UE performance.

Figure 5:
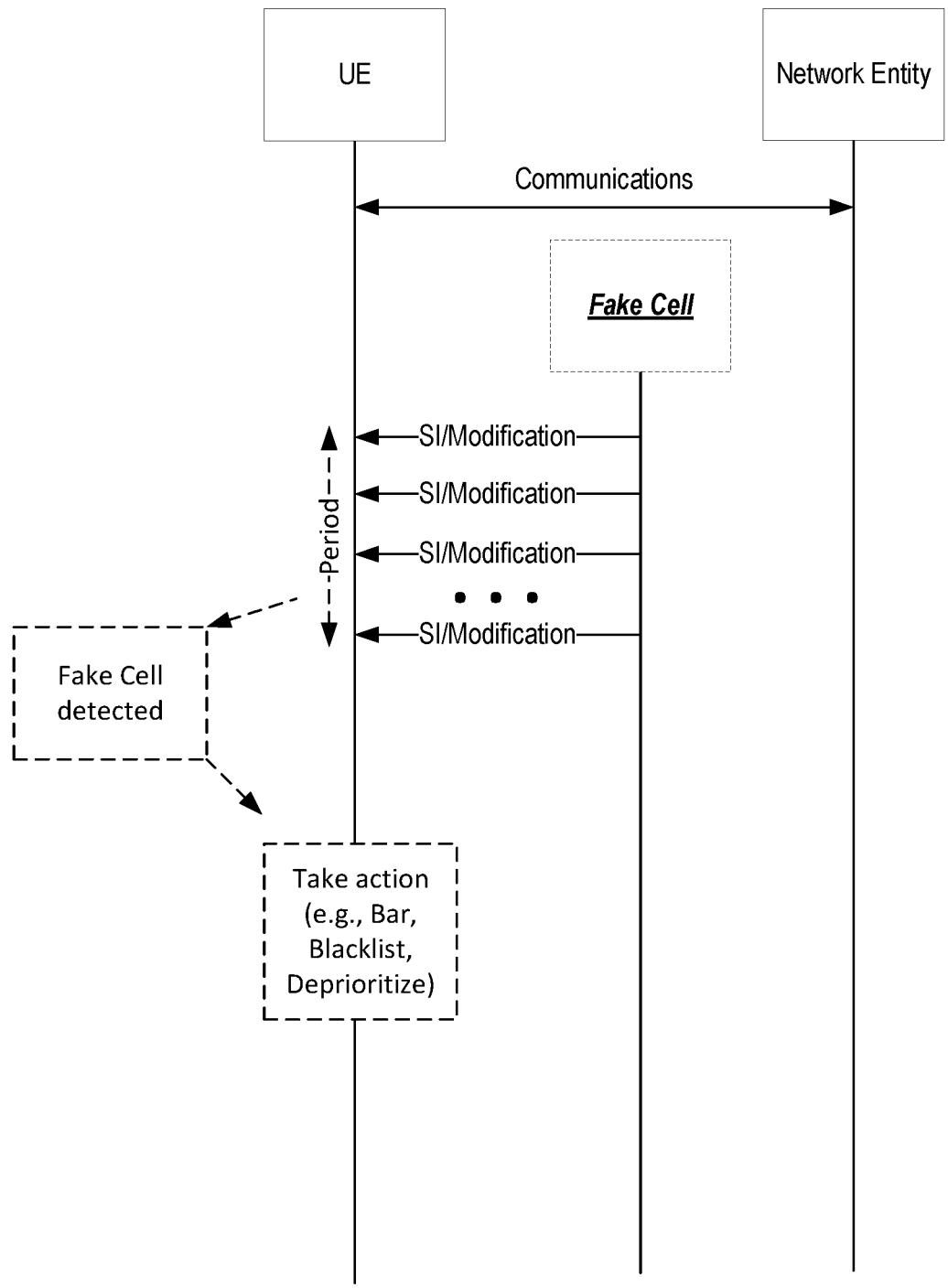
FIG. 5 depicts a call flow diagram for fake cell detection, in accordance with aspects of the present disclosure.

Techniques for fake cell detection proposed herein may be understood with reference to the example call flow diagram 500 of FIG. 5.

As illustrated, a UE may be in communication with a network entity (e.g., a gNB). An entity posing as a (fake) cell may initiate a fake cell attack by transmitting multiple paging messages indicating a modification to SI.

Once the UE detects a certain number of these indications to modify system information, within a certain period, the UE may declare that a fake cell is detected. Based on the detection, the UE may take appropriate action to avoid camping on the fake cell. For example, the UE may bar the fake cell, place the fake cell on a blacklist, or deprioritize the fake cell.

The techniques described herein may be applied for fake cell detection in a variety of different radio access networks (RANs), such as 4G LTE, NR5G, or future systems (e.g., 6G+). These different RANs may have different mechanisms for indicating modifications to SI.

In LTE, an eNB sends a paging message including a systemInfoModification to notify the UE about a system information change. A UE receiving such a paging message knows that system information will change at the next modification period. Similarly, in NR, a gNB sends a short message (a DCI scrambled with a paging radio network temporary identifier P-RNTI) with the systemInfoModification bit set to notify the UE that system information will change at the next modification period. Future systems may use similar types of mechanisms or may use different mechanisms to notify that system information will change at the next modification period.

Regardless of the particular mechanism, detection of a fake cell may be possible, because having frequent systemInfoModifications across multiple broadcast channel (BCCH) modification periods is not an expected scenario. In other words, SI modifications are not expected to happen that frequently. Therefore, when a UE detects such a scenario, the UE may bar or deprioritize such a cell that has such frequent systemInfoModification indications. Taking such action may allow the UE to camp on other available cell, which may improve UE battery life, improve overall user experience, and quality of service (QoS) may also be better.

Figure 6:
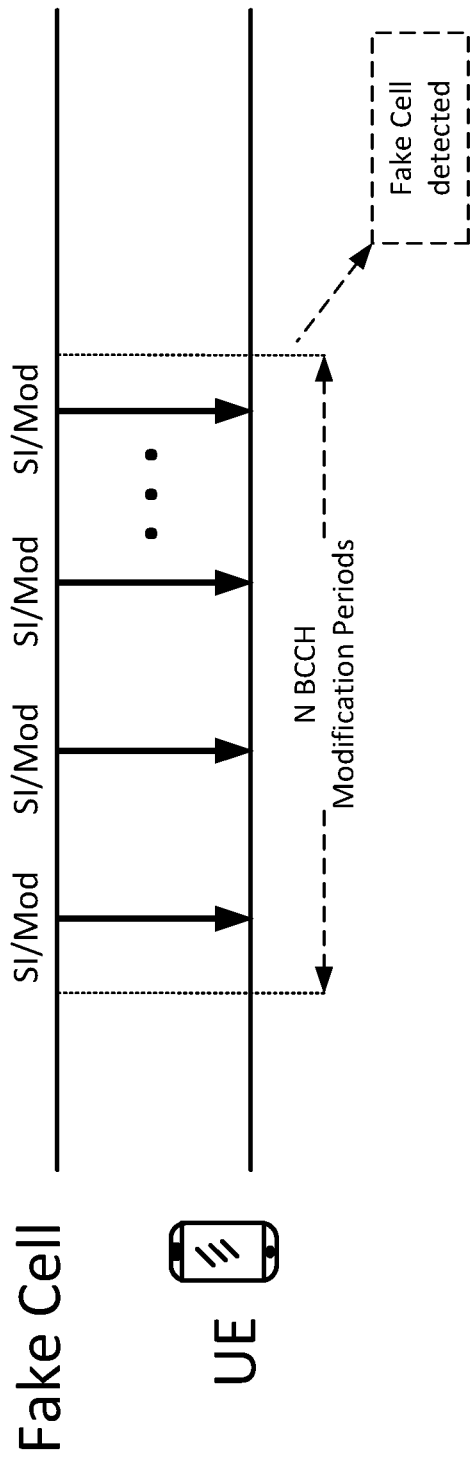
FIG. 6 depicts a timing diagram for fake cell detection, in accordance with aspects of the present disclosure.

As illustrated in FIG. 6, a UE may declare a fake cell is detected if it detects multiple SI modification indications across N (multiple) consecutive BCCH modification periods The value of N may be set to a value designed to ensure that a fake cell is not detected when an ordinary SI modification is indicated. For example, one or two indications for SI modification may be an expected scenario and might occur. Therefore, N may be set to a higher value range (e.g., 5-10) because that many continuous SI modification indications in consecutive BCCH modification periods would not typically be expected.

If a fake cell is detected, the UE may take appropriate action (e.g., a countermeasure). For example, the UE may put the cell on a first list of cells the UE is barred from accessing, the UE may put the cell on a second list of cells deprioritized for cell reselection, or the UE could put the cell on a third list of blacklisted cells that are not applicable in event evaluation or measurement reporting. Each of these actions may help the UE from camping on a fake cell.

In some cases, the fake cell may be placed on one of the lists (bar, blacklist, or deprioritize) for a given time duration, after which the fake cell may be removed from the list(s). In some cases, a value of the time duration may depend on a network operator and, in some cases, may be dynamically indicated.

Similarly, in some cases, the value of N may be dynamic, may be based on current BCCH modification period, and/or may be depend on a network operator, as well. In some cases, a value of N and a time duration to apply the countermeasure may both be indicated, or indicated as a pair of values (e.g., via an index).

Implementing the techniques presented herein, by a UE, may provide significant advantages. For example, such techniques will allow UE to identify fake cells and bar, blacklist, or prioritize them. Then, the UE may camp on other available cells, which will improve UE battery life and overall user experience and quality of service (QOS).

Example Operations of a User Equipment

Figure 7:
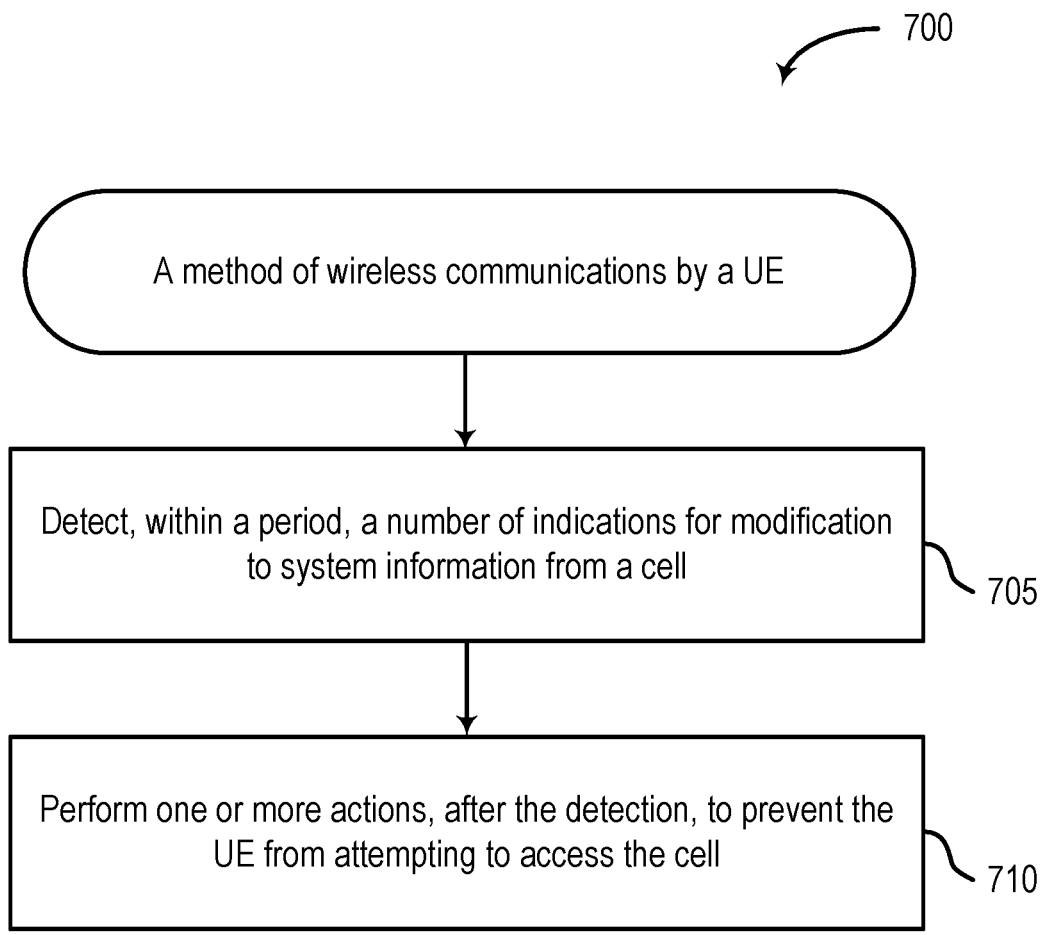
FIG. 7 depicts a method for wireless communications.

FIG. 7 shows an example of a method 700 for wireless communications by a UE, such as UE 104 of FIGS. 1 and 3.

Method 700 begins at step 705 with detecting, within a period, a number of indications for modification to system information from a cell. In some cases, the operations of this step refer to, or may be performed by, circuitry for detecting and/or code for detecting as described with reference to FIG. 8.

Method 700 then proceeds to step 710 with performing one or more actions, after the detection, to prevent the UE from attempting to access the cell. In some cases, the operations of this step refer to, or may be performed by, circuitry for performing and/or code for performing as described with reference to FIG. 8.

In some aspects, the detection of the number of indications within the period indicates the cell is a fake cell.

In some aspects, performing one or more actions comprises placing the cell on at least one list.

In some aspects, the at least one list comprises at least one of: a first list of cells the UE is barred from accessing; a second list of cells deprioritized for cell reselection; or a third list of blacklisted cells that are not applicable in event evaluation or measurement reporting.

In some aspects, the cell is placed on the at least one list for a time duration.

In some aspects, a value of the time duration depends on a network operator; and the value of the time duration is independent of UE actions.

In some aspects, the period is associated with a multiple consecutive BCCH modification periods.

In some aspects, the detection comprises detecting the number of indications in each of the multiple consecutive BCCH modification periods.

In some aspects, a value of the number depends on a network operator associated with the UE.

In some aspects, a value of the number is based on a current value of BCCH modification periods.

Figure 8:
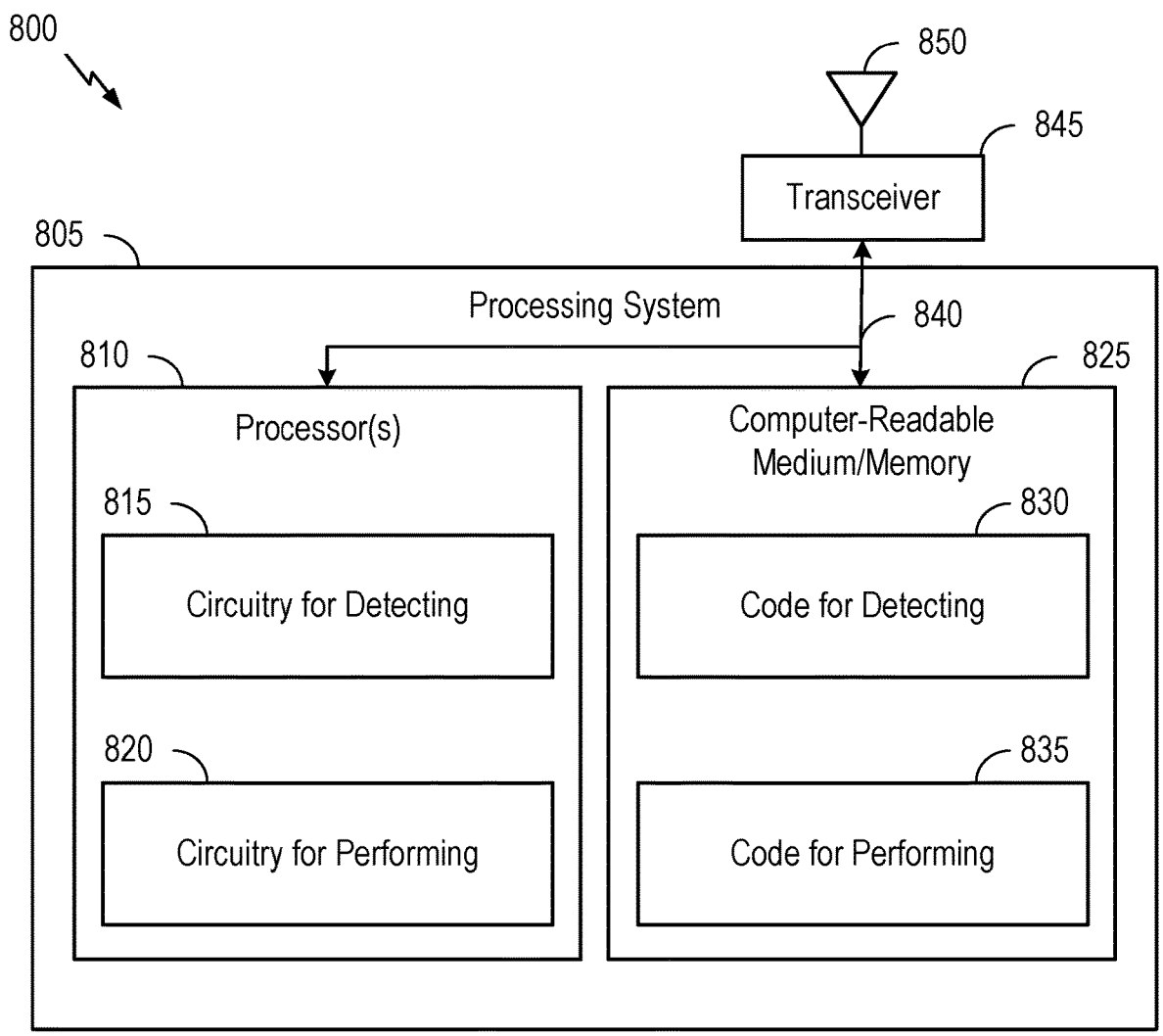
FIG. 8 depicts aspects of an example communications device.

In one aspect, method 700, or any aspect related to it, may be performed by an apparatus, such as communications device 800 of FIG. 8, which includes various components operable, configured, or adapted to perform the method 700. Communications device 800 is described below in further detail.

Note that FIG. 7 is just one example of a method, and other methods including fewer, additional, or alternative steps are possible consistent with this disclosure.

Example Communications Device

FIG. 8 depicts aspects of an example communications device 800. In some aspects, communications device 800 is a user equipment, such as UE 104 described above with respect to FIGS. 1 and 3.

The communications device 800 includes a processing system 805 coupled to the transceiver 845 (e.g., a transmitter and/or a receiver). The transceiver 845 is configured to transmit and receive signals for the communications device 800 via the antenna 850, such as the various signals as described herein. The processing system 805 may be configured to perform processing functions for the communications device 800, including processing signals received and/or to be transmitted by the communications device 800.

The processing system 805 includes one or more processors 810. In various aspects, the one or more processors 810 may be representative of one or more of receive processor 358, transmit processor 364, TX MIMO processor 366, and/or controller/processor 380, as described with respect to FIG. 3. The one or more processors 810 are coupled to a computer-readable medium/memory 825 via a bus 840. In certain aspects, the computer-readable medium/memory 825 is configured to store instructions (e.g., computer-executable code) that when executed by the one or more processors 810, cause the one or more processors 810 to perform the method 700 described with respect to FIG. 7, or any aspect related to it. Note that reference to a processor performing a function of communications device 800 may include one or more processors 810 performing that function of communications device 800.

In the depicted example, computer-readable medium/memory 825 stores code (e.g., executable instructions), such as code for detecting 830 and code for performing 835. Processing of the code for detecting 830 and code for performing 835 may cause the communications device 800 to perform the method 700 described with respect to FIG. 7, or any aspect related to it.

The one or more processors 810 include circuitry configured to implement (e.g., execute) the code stored in the computer-readable medium/memory 825, including circuitry such as circuitry for detecting 815 and circuitry for performing 820. Processing with circuitry for detecting 815 and circuitry for performing 820 may cause the communications device 800 to perform the method 700 described with respect to FIG. 7, or any aspect related to it.

Various components of the communications device 800 may provide means for performing the method 700 described with respect to FIG. 7, or any aspect related to it. For example, means for transmitting, means for sending, means for outputting for transmission, or means for communicating, may include transceivers 354 and/or antenna(s) 352 of the UE 104 illustrated in FIG. 3 and/or the transceiver 845 and the antenna 850 of the communications device 800 in FIG. 8. Means for receiving or obtaining may include transceivers 354 and/or antenna(s) 352 of the UE 104 illustrated in FIG. 3 and/or the transceiver 845 and the antenna 850 of the communications device 800 in FIG. 8. Means for detecting, means for performing, and means for taking action may include one or more of the processors illustrated in FIG. 3.

Example Clauses

Implementation examples are described in the following numbered clauses:

Clause 1: A method of wireless communications at a UE, comprising: detecting, within a period, a number of indications for modification to system information from a cell; and performing one or more actions, after the detection, to prevent the UE from attempting to access the cell.

Clause 2: The method of Clause 1, wherein the detection of the number of indications within the period indicates the cell is a fake cell.

Clause 3: The method of any one of Clauses 1 and 2, wherein performing one or more actions comprises placing the cell on at least one list.

Clause 4: The method of Clause 3, wherein the at least one list comprises at least one of: a first list of cells the UE is barred from accessing; a second list of cells deprioritized for cell reselection; or a third list of blacklisted cells that are not applicable in event evaluation or measurement reporting.

Clause 5: The method of Clause 3, wherein the cell is placed on the at least one list for a time duration.

Clause 6: The method of Clause 5, wherein at least one of: a value of the time duration depends on a network operator; or the value of the time duration is independent of UE actions.

Clause 7: The method of any one of Clauses 1-6, wherein the period is associated with multiple consecutive BCCH modification periods.

Clause 8: The method of Clause 7, wherein the detection comprises detecting the number of indications in each of the multiple consecutive BCCH modification periods.

Clause 9: The method of Clause 8, wherein a value of the number depends on a network operator associated with the UE.

Clause 10: The method of Clause 8, wherein a value of the number is based on a current value of the BCCH modification period.

Clause 11: An apparatus, comprising: a memory comprising executable instructions; and a processor configured to execute the executable instructions and cause the apparatus to perform a method in accordance with any one of Clauses 1-10.

Clause 12: An apparatus, comprising means for performing a method in accordance with any one of Clauses 1-10.

Clause 13: A non-transitory computer-readable medium comprising executable instructions that, when executed by a processor of an apparatus, cause the apparatus to perform a method in accordance with any one of Clauses 1-10.

Clause 14: A computer program product embodied on a computer-readable storage medium comprising code for performing a method in accordance with any one of Clauses 1-10.

Clause 15: A UE comprising: at least one transceiver; a memory comprising instructions; and one or more processors configured to execute the instructions and cause the UE to perform a method in accordance with any one of Clauses 1-10, wherein the detection is performed based on signals received by the transceiver.

Clause 16: A UE comprising: at least one transceiver; a memory comprising computer-executable instructions; and one or more processors configured to execute the computer-executable instructions and cause the UE to: receive signals via the transceiver; detect, within a period, a number of indications for modification to system information from a cell, wherein the detection is performed based on the signals; and perform one or more actions, after the detection, to prevent the apparatus from attempting to access the cell.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communications at a user equipment (UE), comprising:
   detecting, within a period, a number of indications for modification to system information from a cell, wherein the period is associated with multiple consecutive broadcast channel (BCCH) modification periods; and
   performing one or more actions, after the detection, to prevent the UE from attempting to access the cell.

2. The method of claim 1, wherein the detection of the number of indications within the period indicates the cell is a fake cell.

3. The method of claim 1, wherein performing one or more actions comprise placing the cell on at least one list.

4. The method of claim 3, wherein the at least one list comprises at least one of:
   a first list of cells the UE is barred from accessing;
   a second list of cells deprioritized for cell reselection; or
   a third list of blacklisted cells that are not applicable in event evaluation or measurement reporting.

5. The method of claim 3, wherein:
   the cell is placed on the at least one list for a time duration; and
   at least one of:
      a value of the time duration depends on a network operator, or
      a value of the time duration is independent of UE actions.

6. The method of claim 1, wherein the detection comprises detecting the number of indications in each of the multiple consecutive BCCH modification periods.

7. The method of claim 1, wherein a value of the number depends on a network operator associated with the UE.

8. The method of claim 1, wherein a value of the number is based on a current value of the BCCH modification period.

9. A method of wireless communications at a user equipment (UE), comprising:
   detecting, within a period, a number of indications for modification to system information from a cell, wherein a value of the number depends on a network operator associated with the UE; and
   performing one or more actions, after the detection, to prevent the UE from attempting to access the cell.

10. An apparatus configured for wireless communication at a user equipment (UE), comprising:
    at least one memory comprising computer-executable instructions; and
    one or more processors configured to execute the computer-executable instructions and cause the apparatus to:
       detect, within a period, a number of indications for modification to system information from a cell, wherein the period is associated with multiple consecutive broadcast channel (BCCH) modification periods; and
       perform one or more actions, after the detection, to prevent the apparatus from attempting to access the cell.

11. The apparatus of claim 10, wherein the detection of the number of indications within the period indicates the cell is a fake cell.

12. The apparatus of claim 10, wherein performing one or more actions comprises placing the cell on at least one list.

13. The apparatus of claim 12, wherein the at least one list comprises at least one of:
    a first list of cells the apparatus is barred from accessing;
    a second list of cells deprioritized for cell reselection; or
    a third list of blacklisted cells that are not applicable in event evaluation or measurement reporting.

14. The apparatus of claim 12, wherein:
    the cell is placed on the at least one list for a time duration; and
    at least one of:
       a value of the time duration depends on a network operator; or a value of the time duration is independent of UE actions.

15. The apparatus of claim 10, wherein the detection comprises detecting the number of indications in each of the multiple consecutive BCCH modification periods.

16. The apparatus of claim 10, wherein a value of the number depends on a network operator associated with the UE.

17. The apparatus of claim 10, wherein a value of the number is based on a current value of the BCCH modification period.

18. An apparatus configured for wireless communication, comprising:
- at least one memory comprising computer-executable instructions; and
- one or more processors configured to execute the computer-executable instructions and cause the apparatus to:
  - detect, within a period, a number of indications for modification to system information from a cell, wherein a value of the number depends on a network operator associated with the apparatus; and
  - perform one or more actions, after the detection, to prevent the apparatus from attempting to access the cell.

19. An apparatus configured for wireless communication, comprising:
- at least one memory comprising computer-executable instructions; and
- one or more processors configured to execute the computer-executable instructions and cause the apparatus to:
  - detect, within a period, a number of indications for modification to system information from a cell, wherein a value of the number is based on a current value of a broadcast channel (BCCH) modification period; and
  - perform one or more actions, after the detection, to prevent the apparatus from attempting to access the cell.

20. A user equipment (UE), comprising:
at least one transceiver;
a memory comprising computer-executable instructions; and
one or more processors configured to execute the computer-executable instructions and cause the UE to:
receive signals via the transceiver;
detect, within a period, a number of indications for modification to system information from a cell, wherein the detection is performed based on the signals, wherein the period is associated with multiple consecutive broadcast channel (BCCH) modification periods; and
perform one or more actions, after the detection, to prevent the UE from attempting to access the cell.

* * * * *